United States Patent [19]

Bain et al.

[11] 3,950,313

[45] Apr. 13, 1976

[54] NITROGEN POLYMER COMPOSITIONS HAVING THERMALLY REVERSIBLE CROSS-LINKS RESULTING FROM TREATMENT WITH ORGANOMETALLIC COMPOUNDS

[75] Inventors: Peter James Stratford Bain, Llangollen; William Rees Foster, Wrexham; Alan Jeffrey Neale, Llangollen, all of Wales

[73] Assignee: Monsanto Chemicals Limited, London, England

[22] Filed: Nov. 6, 1972

[21] Appl. No.: 303,692

[30] Foreign Application Priority Data

Nov. 9, 1971 United Kingdom .............. 51951/71

[52] U.S. Cl. ....... 260/79.5 C; 260/23.7 N; 260/80.7; 260/82.1; 260/83.3; 260/DIG. 31

[51] Int. Cl.² ...................... C08D 5/02; C08D 13/28

[58] Field of Search ....... 260/79.5 C, 775, 785, 788, 260/83.3, 82.1, 80.73, 85.55, DIG. 31, 80.7, 80.3

[56] References Cited

UNITED STATES PATENTS

| | | | |
|---|---|---|---|
| 2,955,093 | 10/1960 | Solomon | 260/23.7 |
| 2,970,132 | 1/1961 | Reynolds | 260/86.1 |
| 3,268,490 | 8/1966 | Sunden | 260/78.5 |
| 3,642,727 | 2/1972 | Ashworth | 260/79.5 A |

FOREIGN PATENTS OR APPLICATIONS

| | | | |
|---|---|---|---|
| 1,186,693 | 4/1970 | United Kingdom | 260/775 |

OTHER PUBLICATIONS

Chem. Abst., 68, 50776g, (Donstov et al.), [1968].

*Primary Examiner*—Christopher A. Henderson

[57] ABSTRACT

Polymer compositions and processes for preparing polymer compositions having thermally reversible cross-links are described which compositions comprise a polymer having nitrogen atom-containing groups pendant from the polymer chain cross-linked by co-ordination bonds of nitrogen atoms of adjacent chains with the metal atom of a metal-containing organic compound in which the metal atom is attached to the organic moiety through sulfur or oxygen.

14 Claims, No Drawings

NITROGEN POLYMER COMPOSITIONS HAVING THERMALLY REVERSIBLE CROSS-LINKS RESULTING FROM TREATMENT WITH ORGANOMETALLIC COMPOUNDS

This invention relates to polymeric compositions more particularly to cross-linked polymeric compositions in which the cross-links are thermally labile.

Polymeric materials can be broadly classified as either thermoplastic or thermosetting according to their behaviour on heating. Thermoplastic resins are those which can be softened or melted by heat and while soft or molten can be moulded, cast or extruded under pressure. On cooling below their softening point, they become rigid and retain the shape of the mould. Thermoplastic castings or mouldings, upon being reheated, again become soft and fusible and can be remoulded.

Thermosetting resins include prepolymers and other precursors which can be softened by heating and while soft can be moulded or cast under heat and pressure. They change chemically, however, during heating, to become hard, infusible substances, so that once the resin has set or cured it cannot be softened by heating, or remoulded. The difference in behaviour between thermoplastic and thermosetting resins is associated with a difference in molecular structure, the former having essentially linear molecules with little or no intermolecular interaction, while the latter have a three-dimensional structure with interchain cross-links.

It will be seen that the manufacture of articles from thermosetting resins has certain unfavourable features compared with the use of thermoplastic resins; in particular there is a limit to the time during which the resin can be held at an elevated temperature before moulding, and there can be no reworking of scrap mouldings. On the other hand, thermoset resins have in many instances desirable physical properties which cannot be matched by those of thermplastic resins.

The conventional vulcanisation of hydrocarbon rubbers, for example natural rubber or styrene-butadiene rubber, in which the rubber is heated with sulphur, is, on a broad view, an irreversible reaction analogous to the curing of a thermosetting resin. The limitation on the duration of holding the mixture at an elevated temperature before moulding is encountered in the phenomenon of scorch or prevulcanisation, so that close control of mixing times and temperatures and of the forming processes prior to vulcanisation is essential if high scrap rates are to be avoided. Forming operations such as injection moulding can, under appropriate conditions, be used in the production of vulcanised rubber articles. Unlike the injection moulding of thermoplastics, however, where a cooled mould can be used and the casting removed very shortly after injection, the vulcanisation requires the use of a heated mould and residence in the mould until vulcanisation is complete.

Other methods of vulcanising elastomers, for example the use as vulcanising agents of sulphur-donating compounds or organic peroxides in the vulcanisation of hydrocarbon rubbers, or the use of metal oxides in the vulcanisation of polychloroprene, involve irreversible cross-link formation, and the processing limitations consequent thereon.

Polymeric compositions having thermally reversible cross-links, so that the compositions would exhibit properties characteristic of thermoset resins or vulcanised rubbers at service temperatures, but thermoplastic properties, at higher, processing temperatures, with restoration of the service temperature properties on cooling, would therefore represent a valuable advance in plastics and rubber technology. Such compositions and a process for their production are provided by the present invention.

In one aspect, a composition of the invention is a cross-linkable polymer composition comprising a polymer having nitrogen atom-containing groups pendant from the polymer chain, and an organometallic compound containing a metal atom capable of complex formation with at least two of the said nitrogen atoms.

In a further aspect, a composition of the invention is a cross-linked polymer composition comprising a polymer having nitrogen atom-containing groups pendant from the polymer chain and wherein cross-links exist by co-ordination of nitrogen atoms of adjacent chains with the metal atom of an organometallic compound, the said cross-links being substantially the only type of cross-links in the polymer composition.

The process of the invention comprises incorporating an organometallic compound into a polymer having nitrogen atom-containing groups pendant from the polymer chain, the organometallic compound being one containing a metal atom capable of complex formation with at least two of the said nitrogen atoms whereby the organometallic compound is capable of functioning as a cross-linking agent, in the substantial absence of conditions which would produce permanent cross-links in the polymer.

A further aspect of the invention is a method of producing an article from a composition of the invention, which comprises heating the composition to a temperature at which it exhibits smooth flow under pressure, filling a mould with the heated composition, allowing the thus-moulded article to cool to a temperature at which it retains its form on removal from the mould, and removing the cooled article from the mould.

This method can be applied, for example, to the injection moulding of rubber articles, and enables articles having the physical properties of rubber vulcanisates to be produced much more rapidly than by a conventional vulcanisation process.

The foregoing method includes the situation where the composition that is heated has already been heated and cooled once or several times previously, as in the recovery of scrap mouldings.

The organometallic compound can be incorporated into the polymer by any conventional method of mixture, for example on a mill or in an internal mixer, at any temperature at which the polymer is in an adequately plastic condition. Mixing is continued until the organometallic compound is uniformly distributed throughout the polymer.

The cross-linked polymeric compositions of the invention have physical properties characteristic of such compositions, e.g. of thermoset resins or of vulcanised rubbers at temperatures encountered under most service conditions, i.e. at temperatures in the range of 0° to 100°C. or even up to 150°C. At higher temperatures, however, for example above 160°C, the behaviour of the compositions is consistent with scission of the cross links, but these, and the associated physical properties, are restored when the composition cools. Thus the temperature at which the organometallic compound is incorporated into the polymer may be such that cross links are not formed during mixing, but during cooling after mixing.

The nitrogen atom-containing group in a polymer that is cross-linked according to the process of the invention can be for example an amine group, an amide group, a nitrile group, or a cyclic group in which the nitrogen atom accurs as a hetero-atom and in which it may or may not exhibit amine nitrogen properties. An amine group in which the nitrogen atom is not part of a ring is preferably a primary amine group, more especially one in which the nitrogen atom is linked to a non-aromatic carbon atom. Such a pendant group can be for example an aminomethyl, 2-aminoethyl, 2-aminoethylthio or a 4-(aminomethyl)phenyl group. Preferred examples of heterocyclic groups which are also amine groups are pyridyl and alkylpyridyl groups, especially groups where the nitrogen atom is in the 4-position relative to the position of attachment of the pyridyl group to the polymer chain. Another example is the isoquinoline group. The nitrogen atom-containing groups may be introduced into the polymer by polymerisation or interpolymerisation of an appropriate nitrogen atom-containing monomer, which may for example be 4-vinyl pyridine, 2-methyl-5-vinylpyridine, acrylamide or acrylonitrile, or by modification of an existing polymer.

In a particular embodiment of the invention, the polymer is an elastomer which is a copolymer of a diene, for example, 1,3-butadiene or isoprene, and a nitrogen atom-containing monomer, for example 4-vinylpyridine, or an interpolymer of the diene, a nitrogen atom-containing monomer and at least one other ethylenically unsaturated monomer. In such elastomers the additional monomer is preferably styrene or a substituted styrene, but it can, for instance, be an olefin, for example isobutylene, or an ester, for example methyl methacrylate.

In the elastomer, the diene is generally the major component, and typically may represent from 50 to 95%, for example from 55 to 85%, by weight of the elastomer. The nitrogen-containing monomer may constitute from 1 to 30% by weight of the elastomer, the preferred amounts being from 2 to 10% by weight, and more preferred from 2 to 7% by weight of the elastomer. The additional monomer or monomers may typically be present in an amount of from 20 to 30% by weight.

Other polymers to which the process of the invention can be applied include copolymers of nitrogen atom-containing monomers (as exemplified above) with mono-olefins, for instance ethylene, propylene or isobutene, with vinyl aromatic compounds, for instance styrene and substituted styrenes, with vinyl chloride, or with mixtures of such monomers with each other or with other polymerisable monomers.

The organometallic compound that is incorporated into the polymer in the process of the invention is preferably one in which the metal is selected from the complex-forming metals of the First Long Period of the Periodic Table according to Mendeleef, for example, zinc, vanadium, chromium, manganese, iron, and nickel. Particularly good results are obtained using compounds of nickel. Compounds of the complex-forming metals of the Second and Third Long Periods may also be used, however, for example compounds of cadmium, tin, rhodium or iridium.

The organometallic compound may for example be a carboxylate, thiocarboxylate, alkoxide, or mercaptide of the metal, and is preferably one in which the metal is already partially complexed, i.e. there is present at least one group which is bound to the metal atom by a coordinate bond. The organometallic compound is preferably one that is free from atoms or groups attacked to the metal atom which correspond to the anions of strong inorganic acids, for example chloride or sulphate.

The complexes of zinc with two molecules of 2-mercaptobenzothiazole (referred to hereinafter as $Zn(MBT)_2$), and of nickel with two molecules of 2-mercaptobenzothiazole or two molecules of 2-mercaptobenzoxazole (referred to hereinafter as $Ni(MBT)_2$ and $Ni(MBO)_2$ respectively) are very effective cross-linking agents for polymers containing pyridyl groups. Nickel acetyl acetonate and nickel dialkyldithiocarbamates are further examples of effective cross-linking agents for such polymers.

The amount of the organometallic compound used will depend on the properties required in the cross-linked polymer, but is generally within the range 0.5 to 10 parts by weight per 100 parts by weight of the polymer. More usually the quantity is from 1.5 to 7.5, for example from 2 to 6, parts by weight per 100 parts by weight of the polymer.

The compositions of the invention can contain additives customarily included in conventional polymer compositions and substantially inert with respect to the cross-linking process, for example fillers such as carbon black and silica, antidegradants (i.e. antioxidants or antiozonants), and processing aids. Oil-extended synthetic elastomers can be used.

Conditions which would produce permanent cross-links in the polymer, and which must be avoided in the production of the compositions of the invention, include exposing the compositions to radiation of a type capable of generating free radicals at points on the polymer chain, and the presence in the polymer of various substances known to be effective as chemical cross-linking agents. These include organic peroxides, quinones, their precursors such as certain methylol bisphenols, and analogous substances such as dioximes, sulphur, and sulphur-containing vulcanising agents such as thiuram di- and polysulphides and amine di- and polysulphides.

The method of producing an article from a composition of the invention requires the composition to be heated to a temperature at which it exhibits smooth flow under pressure. The temperature at which this condition is met will vary according to the nature of the polymer. In the case of compositions where the polymer is an elastomeric interpolymer of a diene, 4-vinylpyridine and styrene, good flow properties are exhibited at temperatures in the range 180°–220°C.

The invention is illustrated by the following Examples.

EXAMPLE 1

An emulsion polymer was prepared using the formulation given below which was sealed into a mineral water bottle and tumbled in a water bath at 50°C. during 6 hr.

| | | |
|---|---|---|
| Water | 125.00 | g. |
| Potassium sulphate | 0.77 | g. |
| Sodium bicarbonate | 1.08 | g. |
| Sodium lauryl sulphate 40% paste | 6.90 | g. |
| Potassium persulphate | 0.39 | g. |
| t-dodecyl mercaptan | 0.10 | ml. |
| 4-vinyl pyridine | 3.00 | g. |

-continued

| | | |
|---|---|---|
| styrene | 12.00 | g. |
| butadiene | 35.00 | g. |

At the end of the polymerisation, evaporation of a sample in the presence of hydroquinone showed that 82.5% conversion was obtained. The remaining latex was cooled, short-stopped with hydroquinone and coagulated by adding the latex to 500 ml. of hot methyl alcohol. The coagulum was collected, broken into small pieces and stirred with fresh hot methyl alcohol (500 ml.). The polymer was further washed with four changes of water at 60°C. then dried at 1.0 mm. overnight. The polymer was found to contain 0.7% N (Theory 0.8%).

Using this polymer, the mixes listed in the table below were made on a rubber mill heated to 50°C. and samples of the mix heated to 180°C. in a model TM 100 Monsanto Rheometer during 5 min. then cooled to the temperatures indicated in the table and the sample held at the stated temperature during 5 min. before further cooling.

Parts by Weight

| | | | | |
|---|---|---|---|---|
| Rubber | 10.0 | 10.0 | 10.0 | 10.0 |
| $Zn(MBT)_2$ | 0.40 | — | — | — |
| $Ni(MBT)_2$ | — | 0.39 | — | — |
| $Ni(MBO)_2$ | — | — | 0.36 | — |

The weights of metal compounds added are equivalent to $10^{-4}$ mole/g. of rubber.

| Temperature (°C) | | Rheometer torque (foot lb.) | | | |
|---|---|---|---|---|---|
| | 180°C | 27 | 24.5 | 27 | 24 |
| | 160°C | 30.5 | 27.5 | 32.5 | 26 |
| | 140°C | 33 | 31 | 38 | 30 |
| | 120°C | 37 | 36 | 43.5 | 32 |
| | 100°C | 41 | 40 | 49.5 | 35 |
| reheat to | 180°C | 28 | 25 | 30 | 26 |

The higher values of the torque obtained for the rubber containing the additives in comparison with the blank show that the rubber contains significant concentrations of cross-links at 160°C but that at 180°C these are broken to give a rubber with a torque very similar to that obtained for the blank.

EXAMPLE 2

A polymer was prepared under the same conditions as that in Example 1 excepting that the polymerisation time was 5 hr. and the conversion 65%. It had a nitrogen content of 0.8% (theory 0.8%).

The mixes given in the following table were prepared using this polymer in which the concentration of $Ni(MBO)_2$ was varied.

Part by Weight

| | | | | | |
|---|---|---|---|---|---|
| Rubber | | 10 | 10 | 10 | 10 |
| $Ni(MBO)_2$ | | 0.18 | 0.36 | 0.54 | 0.00 |
| moles/g. of $Ni(MBO)_2$ | | $5 \times 10^{-5}$ | $10^{-4}$ | $1.5 \times 10^{-4}$ | |
| Temperature | (°C) | Rheometer torque (foot lb.) | | | |
| | 180 | 22 | 24 | 26 | 19 |
| | 160 | 25 | 28 | 32 | 21 |
| | 140 | 29 | 33 | 39 | 23 |
| | 120 | 34 | 39 | 46 | 26 |
| | 100 | 35 | 41 | 46 | 26 |
| reheat at | 180 | 22.5 | 25 | 28 | 20 |
| return to | 100 | 32 | 39 | 43 | 40 |

The differences in the Rheometer torque suggest that increases in concentration of $Ni(MBO)_2$ result in higher cross-link densities in the polymer. The small differences in torque at 100°C obtained after first cooling from 180°C and then recycling to 180°C and cooling again to 100°C show that the thermal lability of the cross-links is reversible and that the process can be repeated without any significant loss of cross-links.

EXAMPLE 3

A 4-vinyl pyridine-butadiene copolymer was made by the method given in Example 1 but using 3.0 g. of 4-vinyl pyridine and 47.0 g. of butadiene. The conversion after 5 hr. was found to be 55% and the polymer contained 0.7% N.

The torque values obtained on a mix of this rubber with $Ni(MBO)_2$ in comparison with a blank are shown in the following table.

Parts by Weight

| | | | |
|---|---|---|---|
| Rubber | | 10.0 | 10.0 |
| $Ni(MBO)_2$ | | 0.36 | — |
| Temperature | (°C) | Rheometer torque (foot lb.) | |
| | 180 | 31 | 28 |
| | 160 | 35.5 | 30 |
| | 140 | 40 | 32 |
| | 120 | 45 | 35 |
| | 100 | 46 | 37 |
| reheat to | 180 | 33 | — |
| return to | 100 | 45 | — |

EXAMPLE 4

A polymer was prepared by the method given in Example 1 excepting that the polymerisation was carried out during 5 hr. to a conversion of 65% and 1 phr of an antioxidant (polymeric 2,2,4-trimethyltetrahydroquinoline) as a 33% aqueous dispersion was added to the latex. The latex was coagulated by freezing in an acetone/carbon dioxide bath and the thawed mixture was extracted ten times with water at 60°C (600 ml. each time) to extract the emulsifying agent and inorganic salts.

The crumb was dried, and milled with 0.36 grams of $Ni(MBO)_2$ per 10 grams of rubber. A sample of the mixture thus obtained was twice heated to 180°C and allowed to cool, and was then cut into small pieces which were put into a one inch diameter mould heated to 180°C and compressed with a cylindrical ram at a pressure of 500 lb. per sq. in. to give a well moulded cylinder of rubber one inch in diameter and half an inch thick. This illustrates that vulcanisates cross-linked by $Ni(MBO)_2$ co-ordinated with rubber-bound pyridine groups can be remoulded at elevated temperatures.

EXAMPLE 5

The Example shows the use of other nickel compounds as cross-linking agents in the vulcanisation of a 4-vinylpyridine/styrene/butadiene interpolymer. A polymer was prepared by the method given in Example 1 with a polymerisation time of 5 hr. (when the conversion was 65%), and the latex was coagulated using methyl alcohol. 2 Phr of antioxidant (polymeric 2,2,4-trimethyltetrahydroquinoline) was swollen into the rubber from an acetone solution, and the rubber was dried under reduced pressure. The mixes given in the table below were made up on a 6 inch rubber mill heated to 40°C.

Parts by Weight

| | | | | |
|---|---|---|---|---|
| Rubber | 20.0 | 20.0 | 20.0 | 20.0 |
| Nickel II Acetyl Acetonate | 0.51 | — | — | — |
| Nickel II Hexanoate | — | 0.58 | — | — |
| NiMBO | — | — | 0.72 | — |
| Temperature (°C) | | Rheometer Torque (foot lb.) | | |
| 180 | 17 | 18 | 20 | 17 |
| 160 | 20 | 25 | 24 | 18.5 |
| 140 | 23.5 | 30 | 28.5 | 21 |
| 120 | 28 | 34 | 34.5 | 24 |
| 100 | 28 | 35 | 25 | 21 |

EXAMPLE 6

In another test, cross-link formation in compositions of the invention was demonstrated from their behaviour on compression.

Various organometallic compounds, as set out in the table below, were mixed into samples of the 4-vinylpyridine/styrene/butadiene interpolymer of Example 5, in an amount of $10^{-4}$ mole of organometallic compound per gram of interpolymer.

Test samples were prepared by placing 8.3 grams of the mixture, cut into small pieces, into a cylindrical mould which was then heated to 180°C. The mould was closed with a piston to which a pressure of 400 p.s.i. was applied and maintained for 3 minutes. After cooling to 100°C or below, the cylindrical test piece was removed from the mould and allowed to rest for 24 hours before being tested.

The tests were carried out with the sample at 20°±2°C using a standard tensile testing machine fitted with a compression cage, and at a compression rate of 5 mm. per minute. The sample was examined for dimensional recovery 30 minutes after release of the maximum compressive force.

The results are shown below.

| Organometallic Compound | Thickness (mm) Before Compression | Thickness (mm) 30 min. after Compression | Force (kg) for Compression 25% | 40% | 50% |
|---|---|---|---|---|---|
| None | 8.3 | — | 26.5 | 53 | 85 |
| Nickel Hexanoate | 8.54 | 8.53 | 33.5 | 72.5 | 100 |
| Nickel Acetylacetonate | 8.59 | 8.59 | 37.5 | 79.0 | 100 |
| $Zn(MBT)_2$ | 8.51 | 8.46 | 30.5 | 62.5 | 100 |
| $Ni(MBT)_2$ | 8.30 | 8.26 | 33.0 | 66.6 | 100 |

-continued

| Organometallic Compound | Thickness (mm) Before Compression | Thickness (mm) 30 min. after Compression | Force (kg) for Compression 25% | 40% | 50% |
|---|---|---|---|---|---|
| Nickel dibutyldithiocarbamate | 8.60 | 8.58 | 33.0 | 66.6 | 100 |

All the samples containing organometallic compounds showed greater resistance to compression than the blank, from which cross-link formation by the organometallic compound can be deduced. The samples showed good dimensional recovery after compression.

EXAMPLE 7

An elastomeric interpolymer was prepared by the method of Example 1 from a monomeric mixture of 6% by weight of 4-vinylpyridine, 24% by weight of styrene and 70% by weight of butadiene. The elastomer had a Mooney viscosity (ML-100) of 40.

Nickel acetyl acetonate was milled into two samples of the elastomer in amounts corresponding to $5 \times 10^{-5}$ and $10^{-4}$ mole of nickel acetyl acetonate per gram of elastomer respectively (1.3 grams and 2.6 grams of nickel acetyl acetonate per 100 grams of elastomer respectively) on a 9 inch rubber mill at 40°–50°C. The mixtures were moulded using a transfer mould consisting of a heated reservoir and plunger connected through a small orifice to a cavity mould 15 cm square and 2 mm in depth. For moulding, the elastomer was placed in the reservoir, the reservoir and mould were heated to 190°–200°C. and the elastomer was transferred to the mould by operating the plunger.

Measurements of the physical properties of the sheets of elastomer thus formed were carried out on test pieces cut from the sheets with a British Standard Type 2 dumb-bell cutter. Results are shown in the following table in which A is the mixture containing $5 \times 10^{-5}$ and B the mixture containing $10^{-4}$ mole of nickel acetylacetonate per gram of elastomer.

| | A | B |
|---|---|---|
| Tensile strength ($Kg/cm^2$) | 24 | 34 |
| Elongation at break (%) | 200 | 210 |
| Modulus 100% | 13 | 14 |
| 200% | 24 | 33 |

The cross-link agents of this invention are metal containing organic compounds in which the metal atom is attached to the organic moiety through sulfur or oxygen. Compounds containing metals of atomic numbers of 22 to 30 are preferred. The sulfur or oxygen atoms are connected to a carbon atom of a heterocyclic radical, for example, as in an azole which is a type of a mercaptide; to a carbonyl or thiocarbonyl, for example, as in a carboxylate, thiocarboxylate or dithiocarbamate; to an aliphatic carbon atom, for example, as in an alkoxide or alkyl mercaptide; or to a phosphorous atom, for example, as in a phosphorodithioate.

Examples of carboxylates are the metal salts of alkanoic and alkenoic acids having, for example, up to 20 carbon atoms per molecule, for example acetic, propionic, butyric, hexanoic, octanoic, lauric, myristic, palmitic, stearic, acrylic, crotonic and oleic acid; metal salts of aromatic monocarboxylic acids for instance benzoic, toluic, salicylic and naphthoic acids; metal salts of polycarboxylic acids, for example oxalic, succinic, adipic, maleic, fumaric, citric, phthalic and pyromellitic acids. Examples of thiocarboxylates are thioacetates, dithioacetates, thioglycollates, dithiobenzoates, dithiosalicylates, dithio-oxalates, dithiocarbamates, N,N-dialkyldithiocarbamates and N-phenyl-N-alkyldithiocarbamates where the N-alkyl groups contain up to 6 carbon atoms, for example N,N-diethyldithiocarbamates, N,N-dibutyldithiocarbamates and N-ethyl-N-phenyldithiocarbamates.

An alkoxide may typically be one derived from an alcohol having from 1 to 12 carbon atoms per molecule. Also included are phenates, including nuclear-substituted phenates such as chlorophenates and alkylphenates.

The mercaptides may for example be derived from alkyl mercaptans, aralkyl mercaptans, thiophenols or from heterocyclic mercapto compounds. The alkyl mercaptides are generally $C_{1-12}$ mercaptides, for example ethyl or butyl mercaptides. Benzyl mercaptan is an example of an aralkyl mercaptan. The thiophenols include nuclear-substituted thiophenols, for example chlorothiophenols and alkylthiophenols. Also included are mercaptans and thiophenols containing more than one —SH group, for example ethylene dithioglycol and dithiocatechol. Examples of heterocyclic mercaptans are 2-mercaptothiazole, 2-mercaptobenzothiazole and 2-mercaptobenzimidazole.

Also useful in the present invention are metal salts of phosphorodithioic acids of the formula $(RO)_2P(=S)SH$ where each R represents a hydrocarbon or substituted hydrocarbon group, for instance an alkyl, cycloalkyl, aryl or aralkyl group. Examples are described in U.S. Pat. Nos. 3,308,103 and 3,496,152 the disclosures of which are incorporated herein by reference. Zinc O,O dialkyl phosphorodithioates of 1–20 carbon atoms are illustrative of this type of compound.

Suitable compounds include zinc butyrate, zinc hexanoate, zinc stearate, zinc thiophenate, manganese acetate, ferric ethylate, iron N,N-diethyldithiocarbamate, nickel butyrate, nickel hexanoate, nickel octanoate, nickel pentachlorothiophenate, nickel dibutyldithiocarbamate, nickel dibutylphosphorodithioate, cadmium diisopropyl phosphorodithioate, tin cyclohexyl methylphosphorodithioate.

Examples of reagents which form complexes with the metals of the First Long Period of the Periodic Table include diamines such as ethylene diamine, alpha,beta-propylene diamine, alpha,alpha prime-dipyridyl, o-phenanthroline; derivatives of alpha-diketones such as the mono and dioximes and the mono and dihydrazones of diacetyl and benzil, beta-diketones for instance acetylacetone and benzoylacetone and their derivatives such as the mono and dioximes. Other reagents include salicylaldoxime, dicyanodiamidine, nitrosophenylhydroxylamine, 8-hydroxyquinoline, glycine, alpha,beta,gamma-triaminopropane, ethylenediamine tetracetic acid, and various organo-substituted phosphines and arsines, for example triphenylphosphine and triphenylarsine. Certain carboxylates, thiocarboxylates and mercaptides are more properly regarded as complexes rather than simple salts, as are metal derivatives of for example catechol.

The complexes may be ionic or non-ionic. Where the complex is cationic, the anion is preferably organic, for example the anion of a carboxylic acid or of an organic sulphonic acid. Specific examples of complexes that can be used in the process of the invention are the complex of zinc with two molecules of 2-mercaptobenzothiazole (referred to hereinafter as $Zn(MBT)_2$), complexes of vanadium with acetylacetone and with benzoylacetone, vanadyl complexes of the formula $M_2[VO(OC_6H_4COO)_2]$. $3H_2O$ and $M_2[VO(C_6H_4O_2)_2]C_6H_6O_2.H_2O$ where M represents ammonium or an alkali metal, the coordinating groups in such vanadyl complexes being derived respectively from salicyclic acid and catechol, complexes of chromium with ethylene diamine, alpha,alpha prime dipyridyl and with acetylacetone, and oxalate complexes of the formula $M_3[Cr(C_2O_4)_3]$ where M is ammonium or an alkali metal, complexes of manganese with acetylacetone and with benzoylacetone and ionic complexes of the formula $M_3[MnA_3]$ and $M[MnA_2(OH_2)_2]$ where A is the divalent anion of oxalic or malonic acid, the complexes of iron with nitrosophenylhydroxylamine and iron complexes containing both beta-diketonic and amine coordinating groups, for instance $(AcAc)_2FePy_2$, where AcAc represents acetylacetone and Py represents pyridine, the complexes of nickel with two molecules of 2-mercaptobenzoxazole and with two molecules of 2-mercaptobenzothiazole (referred to hereinafter as $Ni(MBO)_2$ and $Ni(MBT)_2$ respectively), complexes of the formula $Ni(en)_3X_2$, $Ni(dipy)_3X_2$ and $[Ni(en)_2(OH_2)_2]X_2$ where en represents ethylene diamine, dipy represents alpha, alpha prime-dipyridyl, and X represents acetate or $X_2$ represents oxalate, the non-ionic nickel complexes of the formula $NiG_2$ where G represents dimethylglyoxime, methyl ethyl glyoxime, methyl propyl glyoxime or methyl benzyl glyoxime, the complex of nickel with salicylaldoxime, the complex of nickel with dicyanodiamidine, and the complexes of nickel with acetylacetone and with benzoylacetone.

Other examples are zinc 2-benzamidothiphenate, zinc thiophenate, zinc ethyl mercaptide, cupric dimethyldithiocarbamate, cupric O,O diisopropyl phosphorodithioate, zinc diisopropyldithiocarbamate, zinc O,O diisopropylphosphorodithioate zinc di-n-butyldithiocarbamate, zinc di-n-butylphosphorodithioate, cobalt 2-mercaptobenzothiazole, nickel 2-mercaptobenzothiazole, zinc 2-mercaptothiazole, nickel 2-mercaptothiazole, and zinc 2-mercaptobenzimdazole.

Although the invention has been illustrated by typical examples, it is not limited thereto. Changes and modifications of the examples of the invention herein chosen for purposes of disclosure can be made which do not constitute departure from the spirit and scope of the invention.

What we claim is:

1. A polymer composition comprising an elastomeric polymer having nitrogen atom-containing groups pendant from the polymer chain which polymer is a copolymer of a conjugated diene and a nitrogen atom-containing monomer or an interpolymer of a conjugated diene, a nitrogen atom-containing monomer and at least one other ethylenically unsaturated monomer, and a cross-link agent consisting essentially of an organometallic compound selected from the group consisting of metal carboxylate, a metal thiocarboxylate, metal alkoxide, mercaptide, metal dithiocarbamate and metal phosphorodithioate containing a metal atom which forms thermally reversible cross-links with the nitrogen atoms of at least two of the said pendant groups.

2. The composition of claim 1 in which the amount of cross-link agent is within the range of 0.5 to 10 parts by weight per 100 parts by weight polymer and in which the nitrogen atom-containing monomer is 4-vinylpyridine.

3. The composition of claim 2 in which the metal is zinc or nickel.

4. The composition of claim 3 in which the organic compound is one in which the metal is already partially complexed.

5. The composition of claim 4 in which the organic compound is a complex of zinc with two molecules of 2-mercaptobenzothiazole, a complex of nickel with two molecules of 2-mercaptobenzothiazole, or a complex of nickel with two molecules of 2-mercaptobenzoxazole.

6. The composition of claim 4 in which the organic compound is nickel acetylacetonate.

7. The composition of claim 3 in which the organic compound is a nickel carboxylate or a nickel dialkyldithiocarbamate.

8. A cross-linked polymer composition comprising an elastomeric polymer having nitrogen atom-containing groups pendant from the polymer chain which polymer is a copolymer of a conjugated diene and a nitrogen atom-containing monomer or an interpolymer of a conjugated diene, a nitrogen atom-containing monomer and at least one other ethylenically unsaturated monomer in which the cross-links consist essentially of thermally reversible cross-links formed by co-ordination of the nitrogen atoms of pendant groups of adjacent chains with the metal atom of a metal-containing organic compound selected from the group consisting of metal carboxylate, metal thiocarboxylate, metal alkoxide, mercaptide, metal dithiocarbamate and metal phosphorodithioate.

9. The composition of claim 8 in which the amount of cross-link agent is within the range of 0.5 to 10 parts by weight per 100 parts by weight polymer and in which the nitrogen atom-containing monomer is 4-vinylpyridine.

10. The composition of claim 9 in which the metal is zinc or nickel.

11. The composition of claim 10 in which the organic compound is one in which the metal is already partially complexed.

12. The composition of claim 11 in which the organic compound is a complex of zinc with two molecules of 2-mercaptobenzothiazole, a complex of nickel with two molecules of 2-mercaptobenzothiazole, or a complex of nickel with two molecules of 2-mercaptobenzoxazole.

13. The composition of claim 11 in which the organometallic compound is nickel acetylacetonate.

14. The composition of claim 10 in which the organic compound is a nickel carboxylate or a nickel dialkyldithiocarbamate.

* * * * *